(12) United States Patent
Buskirk et al.

(10) Patent No.: US 8,049,379 B2
(45) Date of Patent: Nov. 1, 2011

(54) DYNAMOELECTRIC MACHINE ROTORS HAVING ENHANCED HEAT TRANSFER AND METHOD THEREFOR

(75) Inventors: Eric Steven Buskirk, Guilderland, NY (US); Curtis Maurice Hebert, Scotia, NY (US)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 12/428,704

(22) Filed: Apr. 23, 2009

(65) Prior Publication Data

US 2010/0270876 A1 Oct. 28, 2010

(51) Int. Cl.
*H02K 9/00* (2006.01)
*H02K 1/32* (2006.01)

(52) U.S. Cl. ......... 310/61; 310/60 A; 310/64; 310/60 R; 310/52; 310/65; 310/58

(58) Field of Classification Search ............ 310/61, 310/60 A, 64, 65, 52, 53, 54, 55, 56, 57, 58, 310/59, 60 R, 62, 63, 270; *H02K 1/32*
See application file for complete search history.

(56) References Cited

U.S. PATENT DOCUMENTS

| | | | |
|---|---|---|---|
| 2,778,959 A | 1/1957 | Kilner | |
| 3,119,033 A * | 1/1964 | Horsley et al. | 310/64 |
| 3,995,180 A | 11/1976 | Giles | |
| 4,543,503 A | 9/1985 | Kaminski et al. | |
| 4,709,177 A | 11/1987 | Kaminski | |
| 5,281,877 A | 1/1994 | Kazmierczak et al. | |
| 5,644,179 A | 7/1997 | Staub et al. | |
| 5,685,063 A * | 11/1997 | Prole et al. | 310/58 |
| 6,204,580 B1 | 3/2001 | Kazmierczak | |
| 6,362,545 B1 * | 3/2002 | Prole et al. | 310/58 |
| 6,459,180 B1 * | 10/2002 | Mori et al. | 310/61 |
| 6,628,020 B1 * | 9/2003 | Tong | 310/61 |

FOREIGN PATENT DOCUMENTS

JP 10285853 A * 10/1998

OTHER PUBLICATIONS

Machine translation of JP 10285853 A.*

* cited by examiner

*Primary Examiner* — Quyen Leung
*Assistant Examiner* — Michael Andrews
(74) *Attorney, Agent, or Firm* — James W. Pemrick; Ernest G. Cusick; Frank A. Landgraff

(57) ABSTRACT

A radial duct for a dynamoelectric machine having a rotor, and a plurality of radial slots in the rotor is provided. A plurality of coils are respectively seated in the radial slots, and the coils form a plurality of radially stacked turns. The radial duct includes one or more cooling slots defined in at least a portion of the radially stacked turns, and extend in a substantially radial direction to the rotor. At least a portion of an interior surface of one or more cooling slots includes one or more ribs for enhanced heat transfer.

8 Claims, 5 Drawing Sheets

US 8,049,379 B2

DYNAMOELECTRIC MACHINE ROTORS HAVING ENHANCED HEAT TRANSFER AND METHOD THEREFOR

BACKGROUND OF THE INVENTION

The present invention relates to increasing heat transfer performance in the rotor of a dynamoelectric machine. Specifically, the invention relates to punching ribs in the radial ducts in a rotor to increase the heat transfer performance.

The rotors in large gas cooled dynamoelectric machines have a rotor body, which is typically made from a machined high-strength solid steel forging. Axially extending radial slots are machined into the outer periphery of the rotor body at specific circumferential locations to accommodate the rotor winding. The rotor winding in this type of machine typically consists of a number of complete coils, each having many field turns of copper conductors. The coils are seated in the radial slots in a concentric pattern with, for example, two such concentric patterns in a two-pole rotor. The coils are supported in the rotor body slots against centrifugal forces by wedges that bear against machined dovetail surfaces in each slot. The regions of the rotor winding coils that extend beyond the ends of the main rotor body are called "end windings" and are supported against centrifugal forces by high strength steel retaining rings. The section of the rotor shaft forging which is disposed underneath the rotor end windings is referred to as the spindle. For ease of reference and explanation hereinbelow, the rotor winding can be characterized as having a central region which contains cooling ducts within the radial slots of the rotor body, a rotor end winding region that extends beyond the pole face, radially spaced from the rotor spindle, and a slot end region which contains the radial flow ventilation or discharge chimneys. The slot end region is located between the central radial flow region and the rotor end-winding region.

The design of large turbo-electric or dynamoelectric machinery requires high power density in the stator and rotor windings. As ratings increase, both specific loading of the windings (i.e., current carried by a given cross section) and the distance to a heat sink such as a cooler (or heat exchanger) also increase.

Direct cooling of the rotor windings is a well-established practice in electric machinery design. The cooling medium, typically hydrogen gas or air, is introduced directly to the winding in several ways. The gas may enter the rotor through subslots cut axially in the radial slots in the rotor body. It is exhausted through radial ducts placed in the copper. The pumping action caused by rotation of the rotor and the heating of the gas pulls gas through the subslot and out the radial ducts. Alternatively, gas may be scooped out of the gap at the rotating surface of the rotor and may follow a diagonal or radial-axial path through the copper winding. The gas exhausts once again at the rotor surface without need for a subslot. These two strategies cool the windings in the rotor body.

BRIEF DESCRIPTION OF THE INVENTION

According to an aspect of the present invention, a radial duct for a dynamoelectric machine having a rotor, and a plurality of radial slots in the rotor is provided. A plurality of coils are respectively seated in the radial slots, and the coils form a plurality of radially stacked turns. The radial duct includes one or more cooling slots defined in at least a portion of the radially stacked turns, and extend in a substantially radial direction to the rotor. At least a portion of an interior surface of one or more cooling slots includes one or more ribs for enhanced heat transfer.

According to another aspect of the present invention, a dynamoelectric machine having a rotor, and a plurality of radial slots in the rotor is provided. A plurality of coils are respectively seated in the radial slots, and the coils form a plurality of radially stacked turns. A plurality of cooling slots are formed in the radially stacked turns. A radial duct is comprised of a column of the cooling slots. The radial duct includes one or more cooling slots defined in at least a portion of the radially stacked turns, and the cooling slots extend in a substantially radial direction to the rotor. At least a portion of an interior surface of the cooling slots includes one or more ribs for enhanced heat transfer.

According to a still further aspect of the present invention, a method of forming a radial duct for a rotor of a dynamoelectric machine is provided. The radial duct has a plurality of ribs that improve the heat transfer of the radial duct. The method includes the steps of providing a grooved punching die having a plurality of grooves corresponding to a shape of the plurality of ribs, providing a winding coil, punching a cooling slot in the winding coil, and repeating the punching step until a desired number of cooling slots are formed in the winding coil.

DETAILED DESCRIPTION OF THE INVENTION

Figure 1:
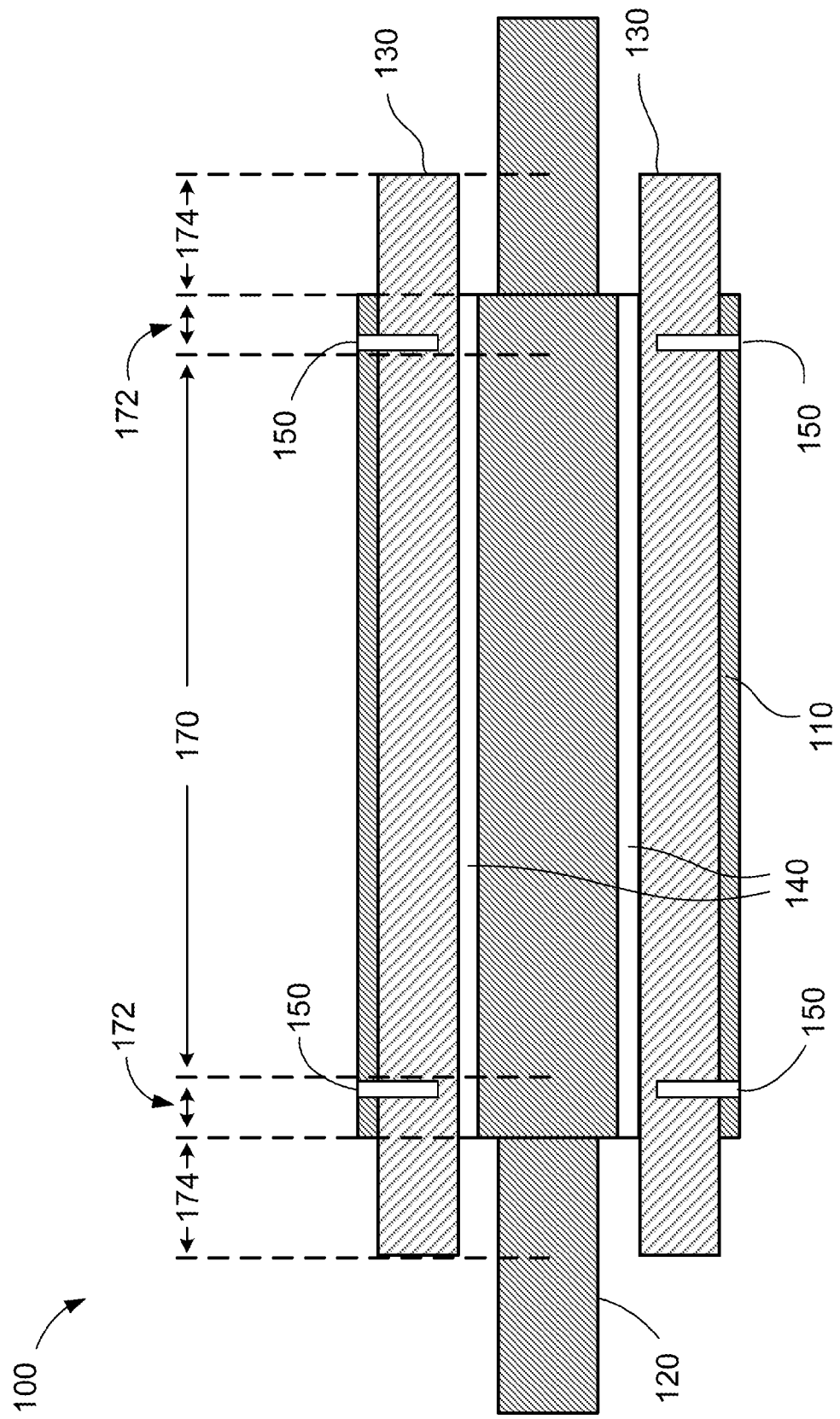
FIG. 1 illustrates a schematic of a rotor of a dynamoelectric machine.

FIG. 1 illustrates a cross-section of a rotor 100 that includes a rotor body 110, rotor spindle 120, winding 130, subslot 140, ventilation or discharge chimneys 150. A plurality of radially-oriented ventilation or discharge ducts (not shown) may also be present. Rotor 100 is typically made from a machined high-strength solid steel forging. Axially extending radial slots are machined into the outer periphery of the rotor body 110 at specific circumferential locations to accommodate the rotor winding 130. The rotor winding 130 typically comprises a number of complete coils, each having many field turns of copper conductors. The coils are seated in the radial slots in a concentric pattern with, for example, two such concentric patterns in a two-pole rotor. The coils are supported in the rotor body slots against centrifugal forces by wedges that bear against machined dovetail surfaces in each slot. The regions of the rotor winding coils that extend beyond the ends of the main rotor body are called "end windings" and are supported against centrifugal forces by high strength steel retaining rings. The end winding section is illustrated by region 174. The section of the rotor shaft forging which is disposed underneath the rotor end windings is referred to as the spindle 120.

For ease of reference and explanation herein-below, the rotor winding can be characterized as having a central region or body cooling region 170, which contain the plurality of radially-oriented ventilation or discharge ducts, within the radial slots of the rotor body. The end-winding region 174 extends beyond the pole face, and is radially spaced from the rotor spindle. The slot end region 172 contains the discharge chimneys 150. The slot end region 172 is located between the body cooling region 170 and the end-winding region 174. In some embodiments, the rotor end region can include the slot end region 172 and/or the end-winding region 174.

Figure 2:
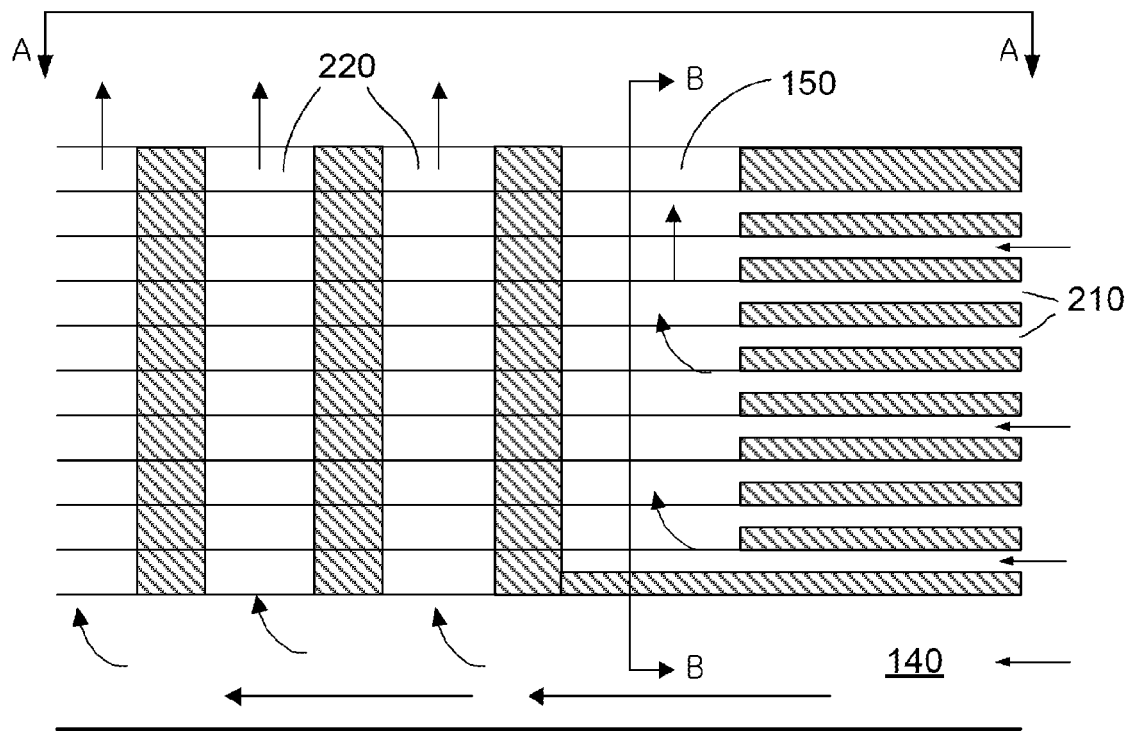
FIG. 2 illustrates a sectional view of a rotor winding.

FIG. 2 shows one known system for cooling the rotor of a dynamoelectric machine. The end turn cooling grooves 210 enter from the right and exhaust to the chimney 150. Cooling gas flows (as indicated by the arrows in FIG. 2) in a generally horizontal or axial direction in cooling grooves 210, and flows in a generally vertical or radial direction in ventilation chimney 150. The holes in each turn (or conductor layer) that comprise the chimney 150 can be referred to as chimney slots. Accordingly, the chimney 150 is comprised of one or more chimney slots. A plurality of radial ducts 220 may also be located to vent gas from subslot 140. The radial ducts 220 may be present in all or a portion of the body cooling region 170.

Figure 3:
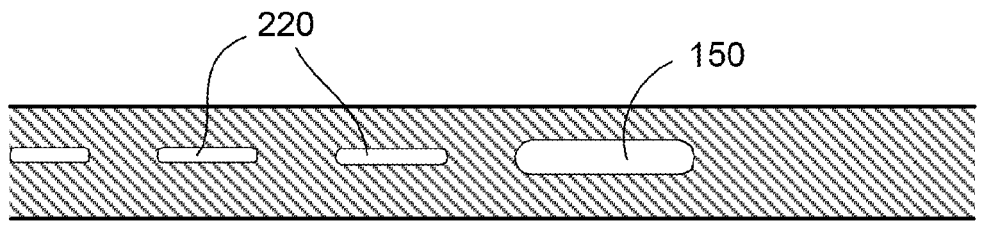
FIG. 3 illustrates a top-down view, along section line A-A of FIG. 2, and shows the relative size of the ventilation chimney compared to the radial ducts.

FIG. 3 illustrates a top view along section line A-A of FIG. 2, and shows the relative size of the chimney 150 compared to the radial ducts 220. The radial cross-sectional area of chimney 150 is larger than the cross-sectional area of ducts 210 or 220. The radial ducts 220 can be located along the length of the coil and are used to cool the coil during operation of the rotor 100. It can be seen that the interior walls of the radial ducts 220 and chimney 150 are smooth.

Figure 4:
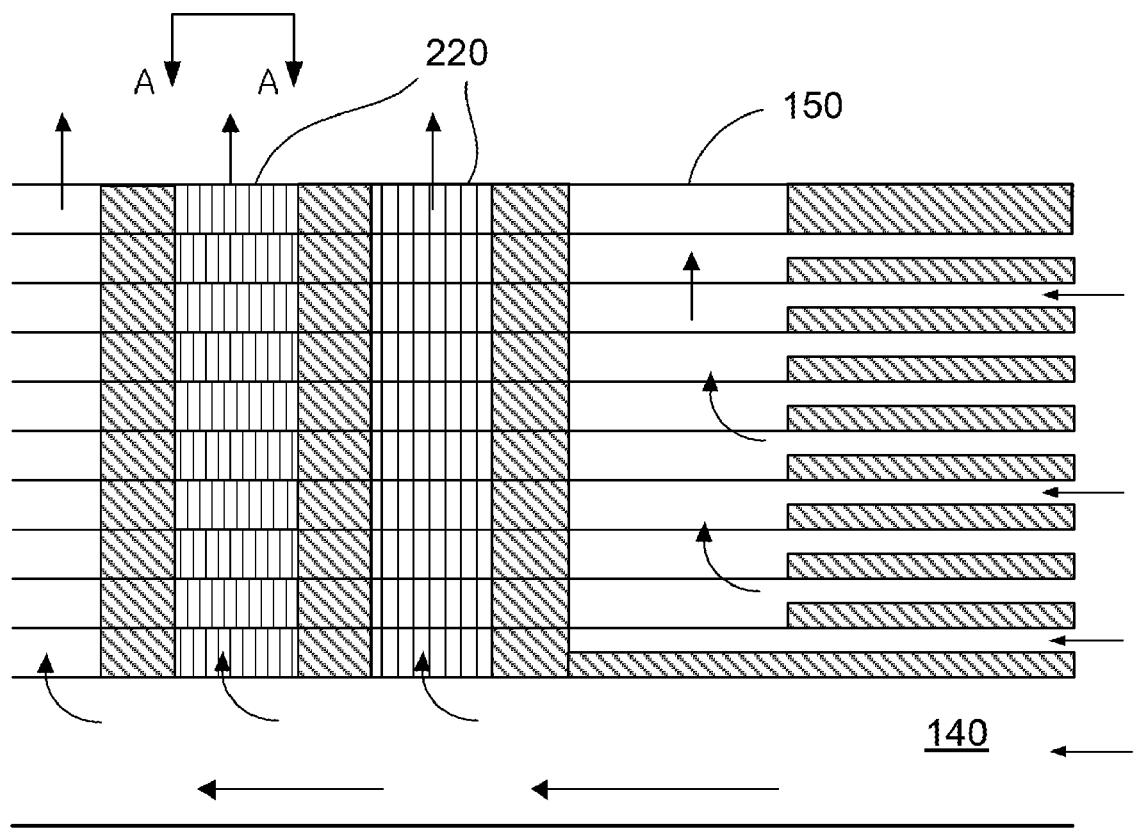
FIG. 4 illustrates a sectional view of a rotor winding with radial ducts having ribs in both an aligned and staggered arrangement.
Figure 5:
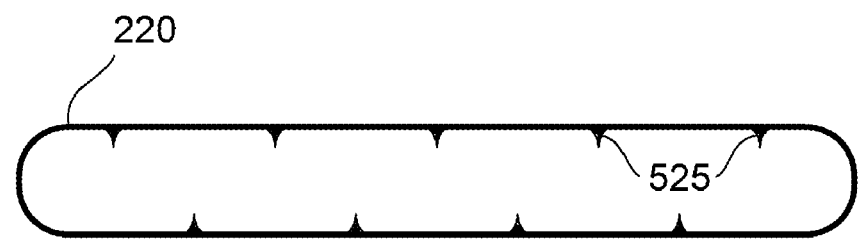
FIG. 5 illustrates a top-down view, along section line A-A of FIG. 4, and shows the profile of the radial ducts.

FIGS. 4 and 5 illustrate one embodiment of the present invention that improves the heat transfer performance of the radial ducts 220. The interior walls of the radial ducts 220 can have a plurality of radially extending ribs 525 formed therein. In this embodiment the walls can have generally triangular or V-shaped projections or ribs 525 which extend out into the flow of the cooling gas. The ribs can be oriented to extend in the radial direction with respect to rotor 100. The ribs 525 increase the surface area of the radial duct 220 and improve the heat transfer between the copper winding and the cooling gas.

In additional embodiments of the present invention, the ribs 525 could be placed on all or a portion of the radial duct's individual windings. As one example, the ribs could be placed on every other winding layer extending radially, and this may help to turbulate the flow. The ribs could also be staggered in each winding layer (as shown in the left duct 220), as opposed to aligned as shown in the right duct 220 of FIG. 4. In some embodiments, the ribs 525 could also be one or combinations of V-shaped, V-shaped with rounded corners, triangular, triangular with rounded corners, trapezoidal, trapezoidal with rounded corners, spherical, quadrilateral, and quadrilateral with rounded corners in cross-section.

As one example, the length and width of duct 220 may be about one inch and 1/10 inch, respectively. The ribs 525 can have a length of about 0.02 inches or more, which extends out towards the center of duct 220. In this embodiment the surface area of the duct would be increased by about 11% over a duct without ribs. However, any suitable number of ribs can be placed within duct 220 and ribs on opposing sides of duct 220 can be aligned (not shown) or staggered (as shown in FIG. 5).

To obtain a duct with an interior surface having projections or ribs 525 the individual copper windings can be milled, coined or punched so that the sides of the duct have the desired contour. A punching operation could employ a grooved die, where the "grooves" on the die correspond to the shape of ribs 525.

Figure 6:
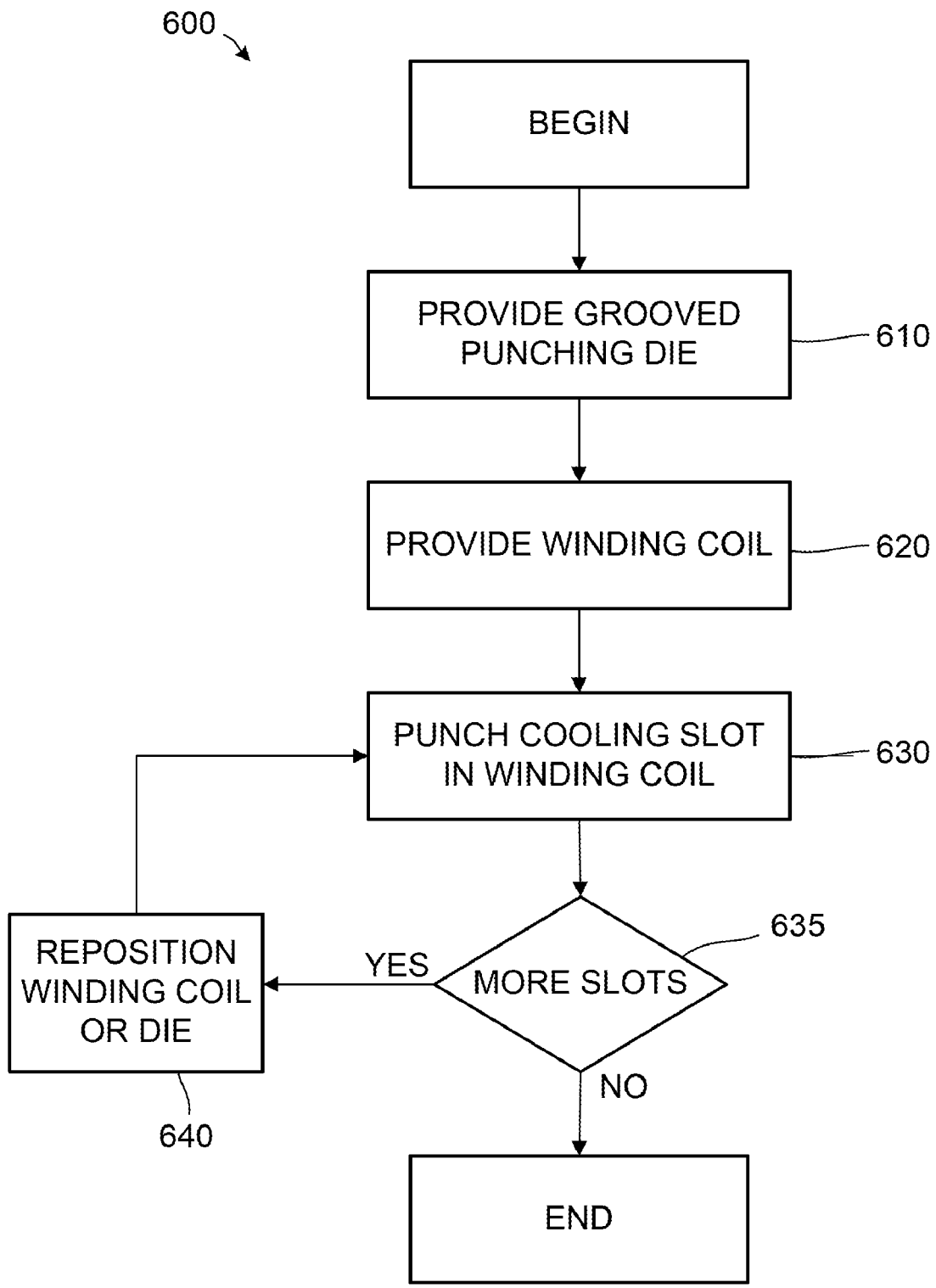
FIG. 6 illustrates a flow chart of the punching process, as embodied by an aspect of the present invention.

FIG. 6 illustrates one embodiment of a punching operation 600 that can be used to obtain a radial duct 220 having ribs 525. A grooved punching die is provided in step 610. The "grooves" in the punching die correspond to the shape of ribs 525. A winding coil is provided in step 620. One of the radial duct slots or cooling slots is punched in the winding coil in step 630. After punching, if more cooling slots are desired (step 635) the winding coil or punching die can be repositioned in step 640. Steps 630 to 640 are repeated until the desired number of cooling slots are punched in the winding coil.

The process of punching the ducts may employ a base plate to support the material being pressed down by the punch. The base plate can be slightly oversized to provide clearance for the punching die. The clearance between the punch and the base plate results in some winding material being unsupported as the punch travels through. Some unsupported material is prone to breakout ahead of the punch tip. The breakout is similar to an expanded exit hole. The hole produced expands where the punch exits the material. The breakout resulting from the punching process is beneficial for the duct design with ribs because the breakout provides electrical strike distance between the ribs on one winding layer to the ribs on the next layer. The strike distance eliminates the need for electrical insulation between ribs on adjacent layers.

Figure 7:
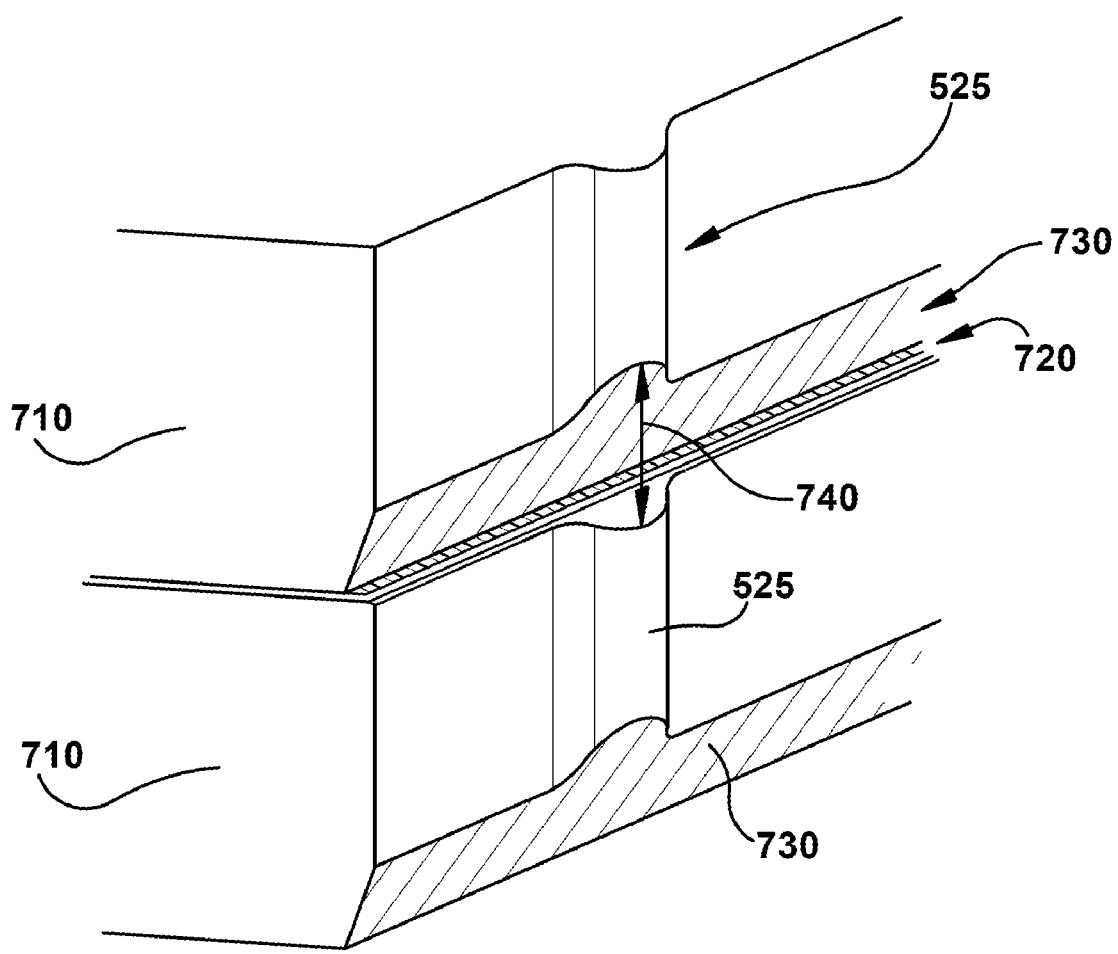
FIG. 7 illustrates a partial perspective view of two winding coils and the breakout formed by the punching process.

FIG. 7 illustrates a partial perspective view of two adjacent windings 710. An insulating layer 720 is placed between both windings 710. The breakout 730, caused by the punching operation, forms a tapered surface and increases the electrical strike distance between adjacent windings. For example, the electrical strike distance 740 would be the distance between a point at the top of rib 525 on the bottom winding extending radially upward to a point on the bottom of rib 525 of the top winding. Machined ducts do not have this breakout region, or the benefit of increased strike distance as provided by aspects of the present invention. The electrical strike distance in machined ducts is the thickness of the intervening insulation layer between windings. In addition, the inter-winding insulation for machined ducts must closely match the profile of the ducts to avoid shorting problems, and this can be costly and difficult to obtain.

All of the above embodiments can be used with radial flow and gap pickup methods of cooling the rotor body, and can be used in various radial duct configurations. In some embodiments, alternating sizes or positions can be employed. The methods and devices described herein can be used in dynamoelectric machines that are cooled with air, hydrogen gas or any other suitable cooling medium.

While the invention has been described in terms of various specific embodiments, those skilled in the art will recognize that the invention can be practiced with modification within the spirit and scope of the claims.

What is claimed is:

1. A radial duct for a dynamoelectric machine having a rotor, a plurality of radial slots provided in said rotor, and a plurality of coils respectively seated in said plurality of radial slots, said plurality of coils comprising a plurality of radially stacked turns, said radial duct comprising:

one or more cooling slots defined in at least a portion of said radially stacked turns, said one or more cooling slots extending in a substantially radial direction to said rotor, the one or more cooling slots comprising multiple ribs arranged in a radially staggered configuration; and wherein at least a portion of an interior surface of said one or more cooling slots is comprised of one or more radially extending ribs for enhanced heat transfer, the one or more radially extending ribs increasing the surface area of the radial duct, and wherein the one or more radially extending ribs include a breakout that provides an increased electrical strike distance between adjacent ribs.

2. The radial duct according to claim 1, wherein said one or more ribs are generally one or combinations of:
V-shaped, V-shaped with rounded corners, triangular, triangular with rounded corners, trapezoidal, trapezoidal with rounded corners, quadrilateral, and quadrilateral with rounded corners in cross-section.

3. The radial duct according to claim 1, wherein said ribs are oriented substantially radially to said rotor.

4. The radial duct according to claim 1, wherein adjacent radially stacked turns have ribs which are offset.

5. A dynamoelectric machine having a rotor, a plurality of radial slots provided in said rotor, and a plurality of coils respectively seated in said plurality of radial slots, said plurality of coils comprising a plurality of radially stacked turns, a plurality of cooling slots formed in said plurality of radially stacked turns, a radial duct comprised of a column of said cooling slots, said radial duct comprising:
one or more cooling slots defined in at least a portion of said radially stacked turns, said one or more cooling slots extending in a substantially radial direction to said rotor, the one or more cooling slots comprising multiple ribs arranged in a radially staggered configuration; and
wherein at least a portion of an interior surface of said one or more cooling slots is comprised of one or more radially extending ribs for enhanced heat transfer, the one or more radially extending ribs increasing the surface area of the radial duct, and wherein the one or more radially extending ribs include a breakout that provides an increased electrical strike distance between adjacent ribs, and the radially stacked turns include a breakout that provides an increased electrical strike distance between adjacent radially stacked turns.

6. The dynamoelectric machine according to claim 5, wherein said ribs are generally one or combinations of:
V-shaped, V-shaped with rounded corners, triangular, triangular with rounded corners, trapezoidal, trapezoidal with rounded corners, quadrilateral, and quadrilateral with rounded corners in cross-section.

7. The dynamoelectric machine according to claim 5, wherein said ribs are oriented substantially radially to said rotor.

8. The dynamoelectric machine according to claim 5, wherein adjacent radially stacked turns have ribs which are offset.

* * * * *